United States Patent [19]

Mühlfeld et al.

[11] Patent Number: 5,972,427

[45] Date of Patent: Oct. 26, 1999

[54] ADSORBENT, SUPPLE, FILTER FABRIC AND METHOD FOR ITS MANUFACTURE

[75] Inventors: Horst Mühlfeld, Grasellenbach; Hansjörg Grimm, Weinheim; Thomas Dabisch, Mörlenbach; Harald Stini, Birkenau, all of Germany

[73] Assignee: Firma Carl Freudenberg, Weinheim, Germany

[21] Appl. No.: 09/021,295

[22] Filed: Feb. 10, 1998

Related U.S. Application Data

[62] Division of application No. 08/615,009, Mar. 12, 1996, abandoned.

Foreign Application Priority Data

Apr. 22, 1995 [DE] Germany .......................... 195 14 887

[51] Int. Cl.[6] .............................. B05D 1/34; B05D 1/36; B05D 3/02
[52] U.S. Cl. ..................... 427/244; 427/179; 427/201; 427/212; 427/337; 427/374.4; 427/375; 427/389.9; 427/412
[58] Field of Search ................................ 427/244, 198, 427/195, 201, 179, 375, 389.9, 420, 2.31, 374.4, 366, 208.2, 212, 337, 412

[56] References Cited

U.S. PATENT DOCUMENTS

| | | | |
|---|---|---|---|
| 4,510,193 | 4/1985 | Blucher et al. .......................... | 428/196 |
| 5,244,695 | 9/1993 | Davidowich et al. ................... | 427/244 |
| 5,281,437 | 1/1994 | Singh ....................................... | 427/202 |
| 5,296,254 | 3/1994 | Tsuru ....................................... | 427/244 |
| 5,374,453 | 12/1994 | Swei et al. .............................. | 427/244 |
| 5,500,247 | 3/1996 | Hagqvist ................................. | 427/244 |
| 5,516,552 | 5/1996 | Bontrager et al. ...................... | 427/244 |
| 5,569,489 | 10/1996 | Kasmark, Jr. ........................... | 427/244 |
| 5,582,865 | 12/1996 | Rezuke et al. .......................... | 427/244 |
| 5,747,110 | 5/1998 | Tallentire et al. ...................... | 427/244 |

*Primary Examiner*—Diana Dudash
*Attorney, Agent, or Firm*—Kenyon & Kenyon

[57] ABSTRACT

An adsorbent, supple, filter fabric composed of an air-permeable, supple, textile, carrier material having adsorbent particles fixed on it by means of a thermoplastic binding agent. The adsorbent particles are coated on their surface with binding-agent particles which are set apart from each other. The average diameter of the binding-agent particles is smaller than that of the adsorbent particles. The adsorbent particles are also bonded to each other by binding-agent particles. The coating of the carrier material with adsorbent material is over 200 g/m$^2$. The fabric has a total thickness of 0.5 to 5 mm, and its suppleness permits a bending radius of not more than 5 mm able to be carried out free of destruction. The filter fabric is manufactured by first mixing absorbent and binding-agent particles while adding water. The mixing is followed by carrying out the following steps in continuous sequence: sprinkling of the mixture on the textile carrier material, heating above the start of melting of the binding agent, and cooling off and rolling up of the resultant supple filter fabric. The product can be used in air purification systems as well as for protective clothing.

12 Claims, No Drawings

ADSORBENT, SUPPLE, FILTER FABRIC AND METHOD FOR ITS MANUFACTURE

This application is a division of Ser. No. 08/615,009, filed Mar. 12, 1996, now abandoned.

BACKGROUND OF THE INVENTION

1. Field of the Invention

The invention relates to an adsorbent, supple, filter fabric as well as a method for its manufacture. More particularly, the invention relates to such filter fabrics which can be used as filtering components of ventilating systems and air conditioning equipment as well as, because of their flexibility, in clothing which is protective against dusty and gaseous hazardous materials.

2. Description of Related Art

German patent DE 33 04 349 C2 discloses a membrane filter, having an adhesive agent imprinted on the textile carrier material in uniform, punctiform distribution by means of a stencil as a pattern of little adhesive piles in the shape of a hemisphere or a cone. Adsorbent particles having a diameter of 0.1 to 1 mm are fixed on it, likewise in uniform, punctiform distribution. The punctiform pattern covers 30 to 70% of the carrier-material surface. The adhesive agent is a solvent-free polyurethane. The quantity of the adsorbent applied is stated with 10 to 200 $g/m^2$.

To produce it, 30 to 70% of the surface of the carrier material is covered by means of a stencil with a punctiform pattern of little adhesive piles in the shape of a hemisphere or a cone. The adhesive is a mixture of a prepolymerized, masked isocyanate and a cross-linking agent. The imprinted surface is sprinkled with adsorbent particles and the adhesive agent is cross-linked.

A disadvantage of this filter fabric is that, in order to obtain sufficient permeability to air, the adsorbent particles are fixed only on the surfaces of the little adhesive piles. This limitation precludes an adsorbent coating above 200 $g/m^2$. In particular, it is not possible to provide for further adsorbent layers. Consequently the quantity of pollutants able to be adsorbed spontaneously is also limited.

The fact that the adsorbent particles cannot mutually bond adhesively, but rather only directly to the little adhesive piles, also rules out the possibility of taking advantage of the higher permeability to air of adsorbent particles up to 5,000 $\mu$m large and at the same time offering a large, spontaneously effective adsorbent surface. Given the suggested dimensions of the little adhesive piles having a height of 0.05 to 0.5 mm and a diameter of 0.2 to 1 mm, not enough binding agent is available for larger quantities of adsorbent particles.

SUMMARY OF THE INVENTION

An object of the present invention is to further develop a filter fabric of the type described above in such a way that adsorbent coatings of markedly over 200 $g/m^2$ are provided, and nevertheless the permeability to air is so good that it can be used as a flow-through filter in industrial installations as well as a component of water-vapor-permeable protective clothing. It shall be possible to design the adsorbent coating of the carrier material in such a way that the particles are also fixed one on top of the other. Furthermore, in the interest of high permeability to air, the possibility shall be offered of providing adsorbent particles in great number which are even up to 5,000 $\mu$m large in diameter and which are also superimposed and fixed together, so that the spontaneously effective adsorbent surface nevertheless remains sufficient. In spite of all that, the filter fabric is to be optionally so supple that it is usable in protective clothing, or shall have a certain rigidity so that in pleated form, for example, it can be used as a pleated filter in air purification systems of any type. At the same time, as a stipulation, in each case a bending radius of not more than 5 mm is to be realized free of destruction.

These and other objects of the invention which will become apparent from the following Detailed Description are achieved by an adsorbent, supple, filter fabric comprising an air-permeable, supple, textile, carrier material and adsorbent particles having an average diameter of 100 to 5,000 $\mu$m fixed on the carrier material by a thermoplastic binding agent, wherein: the adsorbent particles are coated on their surface with binding-agent particles which are set apart from each other; the average diameter of the binding-agent particles is smaller than that of the adsorbent particles; the adsorbent particles are also bonded to each other by binding-agent particles; the coating of the carrier material with adsorbent is over 200 $g/m^2$; the fabric has a total thickness of 0.5 to 5 mm; and the suppleness of the fabric permits a bending radius of not more than 5 mm free of destruction.

The invention also provides a method for the manufacture of an adsorbent, supple, filter fabric, comprising the steps of:

a) mixing at room temperature and for 5 min. of 70 to 95% by weight adsorbent particles of regular or irregular shape having an average particle size of 100 to 5,000 $\mu$m with 30 to 5% by weight binding-agent particles of regular or irregular shape having an average particle size of 90 to 5% that of the adsorbent particles, wherein the melting range of the binding-agent particles is smaller than that of the adsorbent particles and the binding agent does not spread on the adsorbent surface below 100° C., and with 15 to 70% ; by weight water, relative to the total mixture of adsorbent, binding agent and water, the higher binding agent portion being assigned to the smaller average size of the adsorbent particles; and further, comprising the merging sequence of continuous process steps subsequent to this mixing:

b) Sprinkling the mixture as loose pour on a textile carrier material which withstands temperatures of at least 180° C. free of destruction, c) Heating the mixture on the carrier material in an open device for 20 to 120 s to at least 100° C. and at least 5° C. above the start of melting of the binding agent, however below the start of melting of the adsorbent, accompanied by simultaneous escape of the water vapor from the mixture, and d) Cooling off and rolling up of the resultant supple filter fabric.

DETAILED DESCRIPTION OF THE INVENTION

In a known manner, the filter fabric has an air-permeable, supple, textile, carrier material which on one of its surfaces contains adsorbent particles having an average diameter of 100 to 5,000 $\mu$m fixed with a thermoplastic binding agent. In accordance with the invention, the adsorbent particles are coated on their surface with binding-agent particles set apart from each other whose average diameter is smaller than that of the adsorbent particles. The adsorbent particles are also bonded to each other by means of binding-agent particles. The coating of the carrier material with the adsorbent components is over 200 $g/m^2$. The entire fabric has a total thickness of 0.5 to 5 mm and can be bent by a bending radius of 5 mm still free of destruction.

As special protection against mechanical contacts, the adsorbent particles can be provided with a textile covering material on the side facing away from the carrier material. This covering material is able to be thermally set on the adsorbent by means of the binding-agent particles on the adsorbent in the same way as the carrier material.

Both the adsorbent and the binding-agent particles can each have any regular or irregular shape. The conditions for the melting range of the adsorbent particles mentioned below are to be understood in such a way that, regardless of the measuring methods, on no account may the adsorbent begin to melt at the lowest temperature at which the binding agent exists completely in the molten state.

The average size of the binding agent particles can be 5 to 90% that of the adsorbent particles and is advantageously chosen in such a way that the least possible quantity of binding agent effective for the filter efficiency adheres on the adsorbent particles, and nevertheless they are able to be durably fixed to one another.

The supple, filter fabric is essentially free of adsorbent agglomerates which singly would be visible with the naked eye. Rather, a completely irregular distribution of adsorbent and binding agent particles exists.

The selection of the binding agent to be used is subject to one restriction in that it may not spread on the adsorbent surface below 100° C. and therefore may not completely occupy the surface. Furthermore, care must be taken that the flexibility of the binding agent in the final product is so great that it does not impair the suppleness of the final product. Suitable for this purpose are, for example, polyolefins, polyacrylates, polyaryls, polyamides and, in particular, thermoplastic or cross-linkable elastomers such as polyurethanes, polydiene polymers or block copolymers.

Because of the good adhesion both on the adsorbent particles and on the textile carrier material and optionally the covering material, and because of the hydrolytic stability, the flexibility and the melting behavior which is especially suitable for the method according to the invention, a thermoplastic polyurethane binding agent proves to be particularly advantageous having a melting range of 130 to 140° C., which between 130 and 180° C. exists as a highly viscous melt that changes only slightly in its viscosity above this temperature range:

6.4 g/10 min. at 140° C. and 2.16 kp load,
15.4 g/10 min. at 160° C. and 2.16 kp load,
30.9 g/10 min. at 180° C. and 2.16 kp load
(Measured Values in Each Case in Accordance with DIN 53735 [German Industrial Standards])

This polyurethane binding agent is built up based on polycaprolactone, diphenylmethane diisocyanate and a combination of the chain lengtheners 1,4-butanediol and 1,6-hexanediol.

In most cases preference will be given to activated carbon as the adsorbent material because of its broad applicability, wide availability and its non-toxicity.

Depending on the main emphasis of the requirements, the filter fabric can be used in ventilating systems and air conditioning installations for spaces of any type, even in vehicles, where small pressure loss is of importance. For the most part, solely by varying the stiffness of the carrier material and possibly the covering material, one obtains a supple but dimensionally stable, pleated, rolled or folded filter fabric which can be inserted into the installation space available without supporting measures. Filters shaped in such a manner offer a high permeability to air accompanied at the same time by the greatest possible filter mass. This is especially important when the air filter is to be a component of an air supply device for the interior ventilation and/or air conditioning of motor vehicles.

However, given equal adsorbent quantities, the invention also offers the advantageous possibility of providing flexibility which is not only slight (ventilation filters), but also high (protective clothing) solely by the free selection possibility of the textile constituents.

The filter fabric of the invention may be manufactured as follows: 70 to 95% by weight adsorbent particles of regular or irregular shape having an average particle size of 100 to 5,000 $\mu$m is mixed for 5 minutes at room temperature with 30 to 5% by weight binding-agent particles of regular or irregular shape having an average particle size of 90 to 5% that of the adsorbent particles. In so doing, the melting range of the binding-agent particles is chosen to be smaller than that of the adsorbent particles. The binding agent is thermoplastic. Below 100° C. it may not spread on the adsorbent surface and in the solid state may not have too great a brittleness impairing the later flexibility of the fabric. Furthermore, during the mixing, 15 to 70% by weight water is added, relative to the total mixture of adsorbent, binding agent and water, the higher portion of binding agent being assigned to a smaller average size of the adsorbent particles.

The preparation of the mixture can be carried out in any device which assures a homogeneous mixture. Advisably an asymmetric moved mixer is used.

The following process steps proceed quite continuously and merge in their sequence: The mixture is applied as loose pour on a textile carrier material which withstands temperatures of at least 180° C. free of destruction. It is heated for 20 to 120 seconds to at least 100° C. and at least 5° C. above the melting range of the binding agent, however below the beginning of melting of the adsorbent. This can be carried out in a band press or a calender installation, however always in an open device.

The water added to the mixture at room temperature coats surfaces of the adsorbent particles capable of adsorption and thus prevents their excessive coating with hot-melt adhesive substance. During the heating, the vapor formed holds the adsorption-capable pores of the adsorbent particles open. In addition, it forms macroscopic hollow spaces in the filter pour which are conducive to a low pressure loss in the finished filter.

A further advantage of the presence of water vapor during heating is that it accelerates the heat transfer from the band press through the bulk material, so that the process can be carried out particularly economically. Gradually the water vapor passes off completely and the finished, supple, filter material can be lap rolled as a width of fabric.

The resulting filter fabric exhibits a particularly homogeneous structure of its adsorbent components without with a uniform statistical distribution. This distribution takes place already in the mixture due to the addition of water, so that the true specific weight of the pour plays no role in the manufacturing process of the filter.

If a covering of the adsorbent particles is desired, it is applied on the adsorbent surface opposite the carrier material in-line before the heating. Of course the carrier material must also be able to withstand the process temperatures free of destruction. Its flexibility can be selected according to the desired suppleness of the finished filter.

Often devices for purifying air include an adsorbent and a particle-filter medium, for example made of formed fabric. In doing so, both filter types are joined in series in such a way that the air flows through both mediums one after the other. For this as well, the filter fabric according to the invention is suitable as an adsorbently acting component of such a device: It, together with the described covering over the adsorbent particles, can be laminated to a particle-filter medium. Alternatively, dispensing with a covering, it is possible to laminate the adsorbent-coating side directly to a particle-filter medium, for example a formed fabric.

Since activated carbon is particularly resistant to temperature influences, even in the presence of water vapor, preferably this adsorbent is used for the process according to the invention.

Thermoplastic polyurethane with a melting range of 130° to 140° C. has proven particularly advantageous for the conditions of the process according to the invention, a highly viscous melt existing in the range up to 180° C. whose viscosity is largely independent of temperature. Because of its soft segment composition of polycaprolactone, this polyurethane is particularly suitable since it is stable against water vapor hydrolysis under the field conditions of the finished filter. The low melting point and the nearly constant melting viscosity over a broad temperature range already mentioned are achieved by the hard segment composition of 1,4-butanediol and 1,6-hexanediol combined with diphenylmethane diisocyanate.

In a particularly elegant and work-saving manner, the process permits the optionally desired addition of substances dispersible or soluble in water promoting the sorption, or also of $K_2CO_3$ for the chemisorption (neutralization) of sour gases. Before the mixture formation, the additives are simply added in the desired quantity to the water used for it. As a result of the uniform distribution of pressure, temperature and material in the mold cavity during the molding it is assured that these auxiliary agents uniformly coat the sorptive surfaces.

Besides the possibility, after the individual construction, of combining together at least two membrane filters having different sorption-promoting and other auxiliary-substance additives, a particularly advantageous process variant is developing the loose pour as a stratification [an arrangement in layers] composed of at least two adsorbent/binding-agent phases, different quantities of sorption-promoting auxiliary substances being admixed to the individual phases. After molding, a membrane filter results which is multilayered in cross-section having different sorption properties in its layers.

All processes are intended to be designated as "sorption" here in which a gaseous substance is absorbed selectively by adsorption or chemisorption by means of another solid substance coming in contact with it. Without limiting the invention to the following substances, suitable examples are: activated carbon and animal charcoal, silica gel, bleaching earth, activated aluminum oxide and activated bauxite as well as calcium carbonate.

The suppleness of the filter fabric according to the invention, which is variable in wide ranges in response to the given loading with adsorbent, makes it suitable not only for preformed, possibly pleated, yet as a whole still flexibly developed filters in air purification systems of all types, but also in particular for use as a component of protective clothing, to whose face fabrics it can be easily sewn. In thicknesses of 0.5 to 2 mm it is sufficiently water-vapor-permeable for such applications and nevertheless contains sufficiently available, adsorbent surfaces.

Shown by way of example in the following is the manufacture as well as the properties of a membrane filter material from the standpoint of filter and adsorption technology, first of all for the air conditioning system of a motor vehicle, and secondly as a component of an article of protective clothing.

EXAMPLE 1

100.0 parts by weight activated carbon in granulate form having a particle size of 300 to 800 μm and 18.0 parts by weight thermoplastic polyurethane powder having a particle size of 10 to 350 μm, with a melting range of 135 to 140° C. and with melt index values at 140° C. of 6.4 g/10 min, at 160° C. of 15.4 g/10 min and at 180° C. of 30.9 g/10 min, measured in each case according to DIN 53 753 and under a load of 2.16 kp and 80.0 parts by weight water are mixed 5 min. at room temperature in an asymmetric moved mixer.

The mixture is applied as loose pour in an application height of 2 mm on a polyester formed fabric web having a mass per unit area of 40 g/m² and a permeability to air of 3,500 l/m².s at 1 mbar measured according to DIN 53 887.

A second polyester formed fabric web having a mass per unit area and a permeability to air as in the case of the carrier is placed on the pour for the covering.

In a band press with a band clearance of 2 mm the placed web of fabric is exposed to a heat treatment under low pressure at 180° C. and a contact time of 2 min. The water vapor formed can completely escape in the subsequent tension release zone. The carrier formed fabric and the covering formed fabric are firmly anchored on the sintered activated carbon. Thus the fabric web can be lap rolled.

A permeability to air of 995 l/m².s at 1 mbar in accordance with DIN 53 887 is measured on the membrane filter having a thickness of 2 mm and an activated carbon coating of 553 g/m² thus manufactured. The n-butane adsorption (integral method in the range of 0% to 95%, in conformity with DIN 71 460, section 2, draft of November, 1994) amounts to 59 mg n-butane.

The membrane filter is flexible and able to be pleated, but nevertheless possesses sufficient stiffness that it can be inserted in the creased form into ventilation equipment. Its bending rigidity is 231.6 N mm² (measuring conditions: bending angle=30°, bending distance=10 mm).

EXAMPLE 2

The activated carbon mixture of Example 1 is sintered according to the process described in Example 1 on a carrier together with a covering made of a polyester knitted fabric (mass per unit area 58 g/m², permeability to air 6,650 l/m².s at 1 mbar) to form a membrane filter having 2 mm thickness. The activated carbon coating is 604 g/m².

A permeability to air of 1,230 l/m².s, an n-butane adsorption of 71 mg and a bending rigidity of 78.0 N mm² can be measured on this filter (measuring conditions in Example 1).

On the basis of this data, the membrane filter possesses a textile character and is therefore suitable as an adsorbent component of protective clothing. It can be sewn to appropriate face fabrics with the assistance of customary devices.

What is claimed is:

1. A method for manufacturing an adsorbent, supple, filter fabric, comprising the steps of:
    a) mixing at room temperature 70 to 95% by weight adsorbent particles having an average particle size of 100 to 5,000 μm with 5 to 30% by weight binding-agent particles having an average particle size of 90 to 5% that of the adsorbent particles, wherein the binding-agent particles melt over a temperature range that is lower than the lowest temperature at which the adsorbent particles begin to melt, and the binding agent does not spread on the adsorbent surface below 100° C., and with 15 to 70% by weight water, relative to the total mixture of adsorbent, binding agent and water;

b) sprinkling the mixture as loose pour on a textile carrier material which withstands temperatures of at least 180° C. free of destruction;

c) heating the mixture on the carrier material in an open device for 20 to 120 seconds to at least 100° C. and at least 5° C. above the lower end of the temperature range over which the binding melts, however below the lower end of the temperature range over which the adsorbent melts, accompanied by simultaneous escape of the water vapor from the mixture to form a supple filter fabric;

d) cooling off and rolling up of the resultant supple filter fabric.

2. The method according to claim 1, wherein before the step of heating, a textile covering material having at least the same heat resistance as that of the carrier material is placed on the mixture such that the mixture is sandwiched between the textile carrier material and the textile covering material.

3. The method according to claim 1, wherein the adsorbent particles are activated-carbon.

4. The method according to claim 2, wherein the adsorbent particles are activated-carbon.

5. The method according to claim 1, further comprising the step of adding a first substance that promotes sorbtion by the adsorbant particles, which is dispersible or soluble in water, to the water before the mixing step.

6. The method according to claim 2, further comprising the step of adding a first substance that promotes sorbtion by the adsorbant particles, which is dispersible or soluble in water, to the water before the mixing step.

7. The method according to claim 3, further comprising the step of adding a first substance that promotes sorbtion by the adsorbant particles, which is dispersible or soluble in water, to the water before the mixing step.

8. The method according to claim 5, further comprising the step of bonding together a first filter fabric and a second filter fabric after their manufacture, wherein the first filter fabric contains a first substance that promotes sorbtion by the adsorbant particles, and the second filter fabric contains a second substance, different from the first substance, that promotes sorbtion by the adsorbant particles.

9. The method according to claim 1, wherein the loose pour includes a first layer sprinkled on the textile carrier material and a second layer sprinkled on the first layer, and the first layer contains a first substance that promotes sorbtion by the adsorbant particles, and the second layer contains a second substance, different from the first substance, that promotes sorbtion by the adsorbant particles.

10. The method according to claim 2, wherein the loose pour includes a first layer sprinkled on the textile carrier material and a second layer sprinkled on the first layer, and the first layer contains a first substance that promotes sorbtion by the adsorbant particles, and the second layer contains a second substance, different from the first substance, that promotes sorbtion by the adsorbant particles.

11. The method according to claim 3, wherein the loose pour includes a first layer sprinkled on the textile carrier material and a second layer sprinkled on the first layer, and the first layer contains a first substance that promotes sorbtion by the adsorbant particles, and the second layer contains a second substance, different from the first substance, that promotes sorbtion by the adsorbant particles.

12. The method according to claim 1, wherein the step of mixing is conducted for at least about 5 min.

* * * * *

UNITED STATES PATENT AND TRADEMARK OFFICE
CERTIFICATE OF CORRECTION

PATENT NO. : 5,972,427
DATED : October 26, 1999
INVENTOR(S) : Horst MUHLFELD, HANSJORG GRIMM, Thomas DABISCH and Harald STINI.

It is certified that error appears in the above-identified patent and that said Letters Patent is hereby corrected as shown below:

Column 2, line 35, after "70%" delete ";";

Column 4, line 52, after "without" insert - - recognizable agglomerate structures. Adsorbent and binding-agent particles are spatially distributed - -;

Column 7, line 7, after "binding" insert - - agent - -.

Signed and Sealed this

Sixth Day of February, 2001

Attest:

Q. TODD DICKINSON

*Attesting Officer*  *Director of Patents and Trademarks*